United States Patent [19]

Giori

[11] Patent Number: 5,674,578
[45] Date of Patent: Oct. 7, 1997

[54] WATER SOLUBLE/DISPERSIBLE MULTILAYERED FILM OF HIGH INTERLAYER ADHESIVE STRENGTH AND COLLECTION POUCHES FORMED THEREFROM

[75] Inventor: Claudio Giori, Riverwoods, Ill.

[73] Assignee: Hollister Incorporated, Libertyville, Ill.

[21] Appl. No.: 363,936

[22] Filed: Dec. 27, 1994

[51] Int. Cl.$^6$ .............................. B29D 22/00; B32B 7/02; B32B 27/00
[52] U.S. Cl. .................. 428/35.4; 428/35.7; 428/216; 428/500; 428/518; 428/913
[58] Field of Search .................. 428/216, 913, 428/500, 518, 35.4, 35.7

[56] References Cited

U.S. PATENT DOCUMENTS

| | | | |
|---|---|---|---|
| 3,790,067 | 2/1974 | Scheier | 383/1 |
| 4,372,311 | 2/1983 | Potts | 604/364 |
| 4,503,098 | 3/1985 | Potts | 427/394 |
| 4,772,279 | 9/1988 | Brooks et al. | 604/339 |
| 4,917,689 | 4/1990 | Coombes | 604/338 |
| 5,110,390 | 5/1992 | Martini | 156/244.11 |
| 5,391,423 | 2/1995 | Wnuk et al. | 428/217 |
| 5,468,526 | 11/1995 | Allen et al. | 428/35.4 |

FOREIGN PATENT DOCUMENTS

| | | |
|---|---|---|
| 0 012 559A | 6/1980 | European Pat. Off. . |
| 0 273 611A | 7/1988 | European Pat. Off. . |
| 0 513 542A | 11/1992 | European Pat. Off. . |
| 2083762 | 2/1985 | United Kingdom . |
| 2193925 | 7/1990 | United Kingdom . |

OTHER PUBLICATIONS

POLYOX Technical Literature, Union Carbide Corporation, 10 pages (1993).

*Primary Examiner*—Leszek Kiliman
*Attorney, Agent, or Firm*—Tilton Fallon Lungmus

[57] ABSTRACT

A film having at least two layers is disclosed, one layer being composed essentially of a water soluble/dispersible blend of polyethylene oxide (PEO) and plasticized polyvinyl chloride (PVC) and a second relatively weak layer being composed of a water insoluble polymer having high resistance to liquid and gas transmission, particularly a polymer or copolymer of vinylidene chloride (PVDC). Also disclosed is a collection pouch formed of such film. In the fabrication of such a pouch, the film panels are arranged with their PVDC layers in facing relation and the edges of such panels are then heat sealed to each other, resulting in a pouch of relatively high strength and resistance to delamination in use but capable of dissolving/dispersing quickly when discarded into the water of a flush toilet.

7 Claims, 1 Drawing Sheet

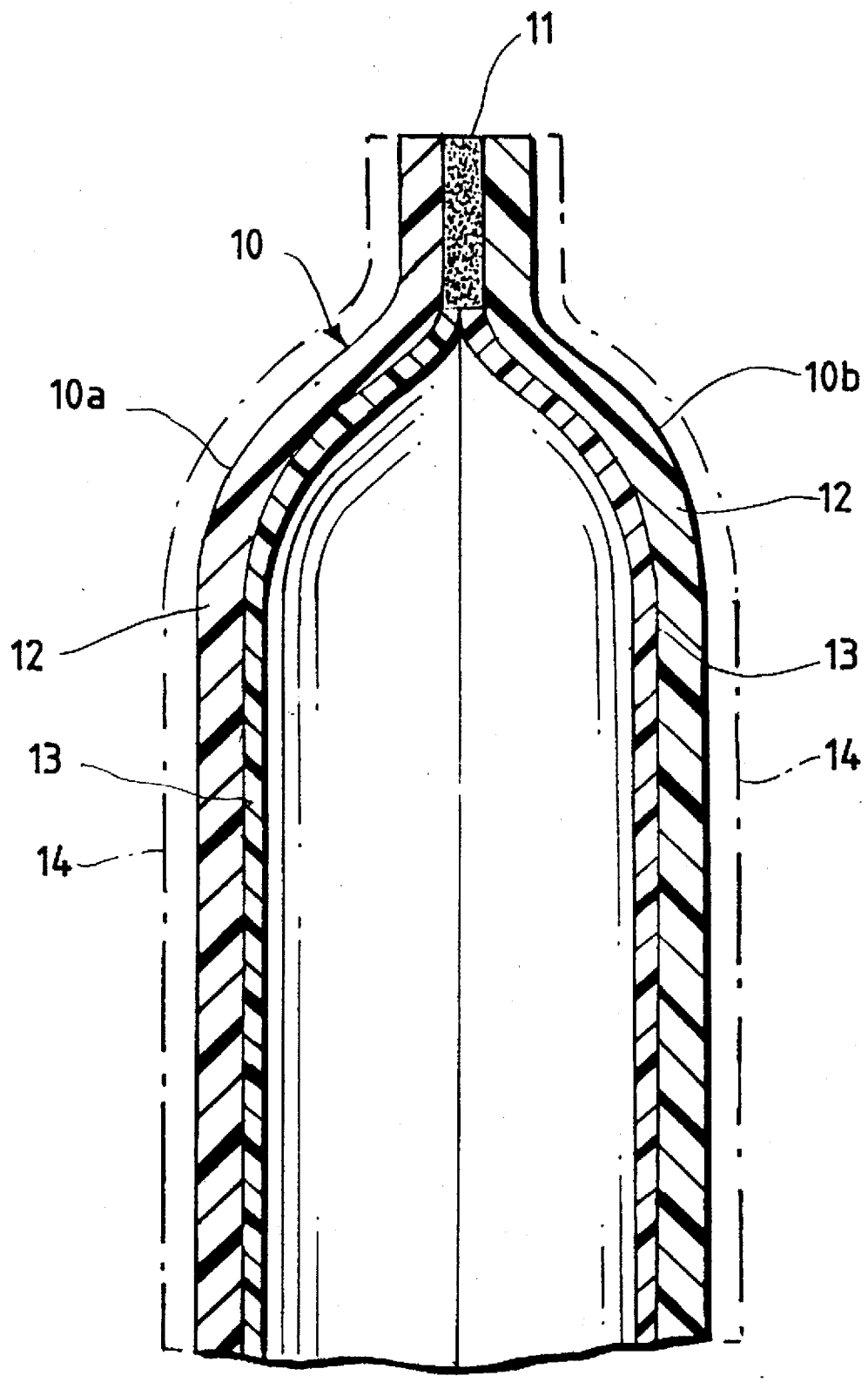

WATER SOLUBLE/DISPERSIBLE MULTILAYERED FILM OF HIGH INTERLAYER ADHESIVE STRENGTH AND COLLECTION POUCHES FORMED THEREFROM

BACKGROUND AND SUMMARY

The prior art indicates that it is possible to fabricate a multilayered pouch capable of being used for collecting bodily excretions (fluid and solid) without dissolving, and at the same time, providing a pouch that is readily dissolvable or dispersible in the turbulent water of a flush toilet. The wall of such a pouch would be typically composed of at least two layers: an outer load-bearing layer of a relatively strong, flexible, but water-soluble polymer such as polyvinyl alchohol or polyethylene oxide and a thin, frangible but water-insoluble inner layer such as polyvinylidene chloride. Because the inner layer is insoluble, the load-bearing outer layer is protected against contact with liquid contents that would otherwise cause the outer layer to dissolve. However, when such a pouch is discarded into a flush toilet, its load-bearing outer layer is exposed to the water in the bowl and quickly dissolves leaving the inner layer which, because of its thinness and frangibility, is incapable of maintaining the integrity of the pouch and, hence, disintegrates.

GB 2 083 762B discloses such a flushable ostomy pouch formed of a composite sheet material having a relatively strong outer water-soluble layer of polyethylene oxide (PEO) or polyvinyl alcohol (PVOH) and a relatively weak but water-insoluble inner layer composed of PVDC pollers or copolymers, atactic polypropylene, nitrocellulose, waxes, greases, silicones, and the like. GB 2 193 925B describes a toilet-disposable sheet material having one ply of PVOH and another of low density polyethylene (PE) or polyvinyl chloride (PVC). U.S. Pat. No. 5,110,390 teaches a laminate for an ostomy bag in which the water-soluble outer layer is PVOH or PEO and the inner layer has co-extruded sublayers of a melt-bondable copolymer of ethylene vinyl acetate (EVA) and a vinylidene chloride polymer or copolymer. U.S. Pat. No. 4,917,689 is concerned with an ostomy pouch having an outer layer of PVOH and an inner layer of PVDC, with an insoluble protective ring extending about those edges of the PVOH layer that define the stoma discharge opening of the pouch.

Other references disclosing multilayered disposable pouches and other containers that are capable of holding liquid contents but of also dissolving or disintegrating because of the solubility of their outer layers are U.S. Pat. Nos. 3,790,067, 4,503,098, 4,772,279 and 4,372,311.

Despite the number of patents that have issued in this field and the evident interest in the concept of providing flushable ostomy pouches capable of dissolving in the turbulent water of flush toilets, the commercial embodiments have been limited in number and those reaching the marketplace do not appear to have received widespread acceptance. One main reason is believed to lie in the problems in achieving sufficient adhesion between the load-bearing outer layers and the protective inner layers. Even when coextruded, a water-soluble hydrophilic polymer such as PVOH or PEO does not bond strongly to a water-insoluble hydrophobic material such as PVDC. The problem becomes particularly apparent when a pouch is formed by heat sealing with such seals being formed between the inner layers (e.g., PVDC) of adjacent panels. When such a pouch is subject to a load, stresses may cause the inner layers to separate from the outerlayers in the seal areas with subsequent mechanical failure of the relatively weak inner layers. If the pouch contains any amount of water, as is generally the case with pouches designed to hold fecal material, the water attacks the soluble outer layers causing pouch failure. While such a problem might be reduced by forming the panels with thicker and stronger inner layers capable of bearing the load of the contents of the pouch even when the inner layers are separated from the supporting outer layers, such a solution would have a negative effect on flushability and would be contrary to the objective of providing a pouch that is water dispersible.

A main aspect of this invention therefore lies in discovering that problems of delamination and pouch failure may be overcome if the water-soluble outer layer of a multilayer pouch is formed of a blend of PEO and plasticized PVC, with the PEO having a viscosity average molecular weight in the general range of 100,000 to 400,000 and comprising about 40 to 80% by weight of the blend. The protective hydrophobic inner layer may be any one of several types of insoluble vinylidene chloride polymers or copolymers (PVDC) offering good resistance to odor transmission, and it is believed that other insoluble but dispersible and heat-sealable thermoplastic polymers having similar properties may also be used. Layer thicknesses may vary but, in general, the outer load-bearing layer should have a thickness within the general range of about 1 to 5 mils and the inner insoluble layer would have a thickness of about 0.05 to 1.0 mils.

The inclusion of plasticized PVC in the blend of the outer layer is believed to reduce the hydrophilicity of that layer and render it more compatible with the hydrophobic inner layer. Notably high interlayer adhesion results, with the insoluble inner layer (e.g. PVDC) showing no tendency to delaminate from the blended PEO/PVC outer layer.

It has also been found that the use of a PEO/PVC blend as the outer layer yields other benefits. The degree of water sensitivity can be controlled by varying the PEO/PVC ratio. The higher the PVC content, the lower the degree of water sensitivity of that blend. Therefore, the ratio may be controlled to provide a pouch with enough water sensitivity to be dissolvable/dispersible when flushed, but enough resistance to incidental exposure to water (e.g., moisture from the skin) to be comfortably and safely worn by a user.

It has also been observed that a PEO/PVC blend has a moisture content that is relatively insensitive to variations in ambient humidity, unlike most water-soluble films which exhibit large variations in moisture content depending on environmental conditions. Additionally, the PVC component of the blend imparts a pleasant, soft or rubbery feel to the film.

Since the PEO/PVC blend is thermoplastic, standard extrusion methods may advantageously be used in contrast to the methods for producing films from most water soluble resins which require casting from aqueous solutions.

Other features, advantages, and objects of the invention will become apparent from the specification and drawing.

DRAWING

The drawing is a somewhat schematic, fragmentary sectional view of a collection pouch, such as an ostomy pouch, embodying this invention.

DETAILED DESCRIPTION OF PREFERRED EMBODIMENTS

The soluble/dispersible film of this invention is "multilayered," such term here being used to mean a laminate composed of at least two layers. The film, and the pouches formed therefrom, are referred to as being "flushable," meaning that such film and products may not only be discarded and flushed away in a conventional flush toilet, but that in the process of doing so the film will at least commence dissolving and dispersing in the turbulent water in the toilet bowl. More specifically, one layer of the film (the outer layer of the product) is soluble and will dissolve and disintegrate whereas the other layer (the inner layer), although insoluble, will tend to disintegrate and disperse because of its relative thinness and lack of strength.

Referring to the drawing, the numeral 10 generally designates the upper portion of a collection pouch, such as an ostomy pouch, having walls or panels 10a and 10b peripherally joined together by heat seal 11. Each wall is composed of a multilayered film comprising a first or outer layer 12 and a second or inner layer 13. Additional layers may be provided as desired. For example, one or both walls of the pouch may be provided with an outer covering layer 14 of soft, porous material such as tissue or film. Soft tissue paper that readily disintegrates in water is believed particularly advantageous because it enhances patient comfort while at the same time prevents skin moisture from directly contacting layer 12. Also, to the extent that such an outer tissue layer quickly absorbs liquid and becomes saturated when a pouch is discarded into a flush toilet, the tissue layer insures intimate contact between the pouch walls and the water and thereby promotes rapid dissolution of the outer layers 12 of those walls.

The outer layer 12 of each wall has a thickness of approximately 1 to 5 mils, preferably 2 to 4 mils, and comprises a blend of polyethylene oxide (PEO) and plasticized polyvinyl chloride (PVC). The PEO content should fall within the general range of 40 to 80% by weight of the blend, preferably 45 to 55% and, conversely, the content of plasticized PVC should fall within the general range of 60 to 20% of the blend, preferably 55 to 45%.

The ratio of PEO to PVC has a direct bearing on the solubility of the outer layer in water and may therefore be adjusted for selectively controlling the dissolution/disintegration rate of the film (and final product) in the bowl of a flush toilet. While rapid dissolution is considered desirable, the water sensitivity of the PEO/PVC blend must not be so great as to risk dissolution or disintegration of an outer layer 12 when a pouch is worn in normal use. It is believed that ideally the outer layer should dissolve and disintegrate when immersed in water for a period of approximately 20 seconds to 2 minutes. Dissolution/disintegration in that interval may be achieved with a blend of approximately 50/50% of PEO/PVC having a layer thickness within the range of about 2 to 4 mils.

The PEO resin should have a viscosity average molecular weight in the general range of 100,000 to 400,000, preferably 200,000 to 300,000. Effective results have been obtained with Polyox WSR N-80 resin having a viscosity average molecular weight of about 200,000 and Polyox WSR N-750 resin having a viscosity average molecular weight of approximately 300,000, both from Union Carbide Corporation, Danbury, Conn., but other resins having different molecular weights might be used. While the molecular weight of the PEO resin used in the blend of this invention is not believed to be critical, at higher molecular weights approaching 400,000 and above, extruding and other processing steps may be difficult if not impossible to carry out.

A minor quantity of a standard antioxidant, such as a phenolic antioxidant, may optionally be present in an amount ranging from 0 to 1% by weight of the PEO resin. Examples of suitable antioxidants are 2,6-bis (1,1-dimethylethyl)-4-methylphenol (Naugard BHT, Uniroyal Chemical Co.), bis(2,4-di-t-butylphenyl) pentaerythritol diphosphite (Ultranox 626, GE Specialty Chemicals), or octadecyl 3,5-di-t-butyl-4-hydroxyhydrocinnamate (Ultranox 276, GE Specialty Chemicals). Other known antioxidants are believed suitable and may be used.

The PVC of the PVC-PEO blend is an extrusion grade material composed of PVC resin and a plasticizer. The plasticizer is preferably an organic ester, most preferably a phthalic ester such as bis(2-ethylhexyl) phthalate. Minor quantities of processing aids, stabilizers, fillers, lubricants or pigments may also be present. Most advantageously, the plasticized PVC should have a durometer value on the Shore A scale (ASTM D-2240) within the range of about 60 to 90, preferably 75 to 80, with such durometer depending largely on the amount of plasticizer used. One plasticized PVC material that has been found particularly effective is "Alpha PVC 2222N-78" from Alpha Chemicals and Plastics Corp., but other extrusion grade plasticized PVC compounds having similar properties may be used.

The plasticized PVC and PEO resins are intimately mixed and pelletized for later use in preparing the film laminate. The blending of the PEO and plasticized PVC takes place at elevated temperature (e.g., 240 to 270 F.) using a twin screw compounder/extruder or other suitable blending and pelletizing equipment.

The inner protective layer 13 is composed of a heat sealable material that is water-insoluble and has good resistance to gas (including odor) and liquid transmission. Polyvinylidene chloride, carboxylated acrylics, polycarbonates and other thermoplastics having similar properties may be used, but vinylidene chloride polymers or copolymers (PVDC) are believed to be particularly effective because of their superior odor barrier properties. Such PVDC polymers are available commercially in the form of coating grades (e.g., "Daran", Hampshire Chemical Corp., and "Serfene", Morton International, Inc.) and as extrusion grades (e.g., "Saran", Dow Chemical Co.), both of which are believed suitable. However, the methodology in forming a two-layer film comprising a PVDC layer and a PEO/PVC layer may be different depending on whether the PVDC is coating grade or extrusion grade.

With coating grade PVDC, any of several methods may be employed. In one such method, solvent-based or water-based PVDC may be cast onto a carrier web and dried. The PEO/PVC blend may then be extruded onto a separate carrier web and the two layers may then be heat laminated together to form the two-layer film. Alternatively, the PEO/PVC blend may be extruded directly onto the carrier-supported PVDC layer. In either case, a relatively strong interlaminar bond is formed between the blended PEO/PVC layer 12 and the PVDC layer 13. This superior interlayer adhesion may be demonstrated by a peel resistance test at 180° using an Instron tester at a constant extension rate of, for example, 12 inches per minute. For comparison, two film samples taken from commercially-available flushable ostomy pouches were also tested. Such control films employ PVDC as the barrier layer and polyvinyl alcohol (PVOH) as the water-sensitive load-bearing layer. One control sample ("Symphony" from Simcare, a subsidiary of Smiths Industries Medical Systems) was found to have a delamination strength of only 3.0 ounces per inch of width. The other control sample ("Serenade", also from Simcare) had a delamination strength of 17.9 ounces per inch of width. By contrast, a film laminate embodying this invention, in which one layer is PEO/PVC and the other is PVDC, could not be delaminated; in other words, the bond strength between the layers exceeded the strength of the layers themselves. Therefore, when such a film is used to form a pouch 10, with the PVDC layers of side walls 10a and 10b facing inwardly and heat sealed at 11 along their margins, the result is a pouch whose integrity is not compromised by inadequate adhesion between layers 12 and 13.

While different techniques may be used to produce the two-layer film if the PVDC is of coating grade, as described above, the preferred process for forming the two-layer film is coextrusion, either blown or cast, if the PVDC is of extrusion grade.

Whatever the technique used to form the two-layer film, the PVDC layer should be relatively thin to promote disintegration after the load-bearing PEO/PVC layer has dissolved or dispersed. Where PVDC is used as the protective barrier layer, the thickness should fall within the general range of 0.05 to 1.0 mils, preferably 0.1 to 0.8 mils.

The invention is further illustrated by the following examples:

EXAMPLE 1

This example illustrates the process of compounding and pelletizing a blend of PEO and plasticized PVC.

PVC 2222 N-78 (Alfa Chemical and Plastics Corp.), 150 lb, and Polyox WSR-N-80 (Union Carbide Corp.), 150 lb, are compounded and pelletized on a 57 mm Werner Pfeiderer twin screw compounder/extruder with corotating intermashing screws at a feed rate of 170 lb/hr and a temperature of 240°–270° F. The resin blend is utilized for extrusion coating or coextrusion as described in Examples 2 and 3.

EXAMPLE 2

This example illustrates the fabrication of a two-layer film in which one layer is a blend of PEO/PVC and the other is coating grade PVDC. The process involves coating PVDC onto a carrier web, then extruding a PEO/PVC blend onto the carrier-supported PVDC layer, and then stripping the carrier web from the two-layer film.

A terpolymer of vinylidene chloride-methylmethacrylateacrylonitrile in a 54% aqueous emulsion (Daran SL 116, Hampshire Chemical) is coated onto a release paper (S.D. Warren Stripkote EHR Matte, 16 in wide) at a line speed of 40 feet per minute. Two coating passes are applied for a total dry coating thickness of 0.6 mil.

Using a 1.5 in extruder equipped with a 22 in die, the PEO/PVC resin blend of Example 1 is extrusion-coated onto the paper-supported PVDC film to a thickness of 2.4 mil at a temperature of 365° F. and at a line speed of 13.5 feet per minute.

The release paper is then stripped off of the film. The resulting film is 3 mil thick, has a tensile strength of 2490 psi and an elongation of 285% (ASTM D 882, machine direction).

EXAMPLE 3

This example illustrates the fabrication of a two-layer film in which one layer is a PEO/PVC blend and the other layer is PVDC, using extrusion grade PVDC.

A cast film coextrusion line equipped with two 1 in extruders having an L/D ratio of 24:1 is employed. The 50/50 blend of PEO/PVC of Example 1 is coextruded with Saran 469, a copolymer of vinylidene chloride and vinylchloride (Dow Chemical Co.). The film obtained has a total thickness of 4.5 mil and consists of a 4 mil PEO/PVC layer and a 0.5 mil PVDC layer. The film has a tensile strength of 2120 psi and an elongation of 310% (ASTM D 882, machine direction).

EXAMPLE 4

This example illustrates the fabrication of flushable pouches from a two-layer film in which one layer is a PEO/PVC blend and the other is PVDC.

The film of Example 2 is converted into pouches by marginally heat sealing together two walls or panels of such film with such walls being arranged so that their PVDC layers face each other towards the pouch interior. The heat seal strength is typically 4.5 lb/in of width (with samples cut perpendicularly to the heat seal and pulled at 12 in/min). The pouches obtained are resistant to fluid attack from the inside. This is illustrated by a hanging test wherein a pouch is filled with water and suspended for 48 hr without leakage. Immersion of the pouches in water with agitation causes the outer layers to dissolve/disperse and the inner layers to rupture.

EXAMPLE 5

The effect of varying the content of plasticized PVC on the water sensitivity of a PEO/PVC blend is revealed by the following test.

Film strips of blended PEO/PVC measuring 1 in by 10 in are suspended in a cylinder full of water with a 50 g weight clipped to the bottom of each strip. In each case, the PEO is Polyox N-80, Union Carbide, and the plasticized PVC is PVC 2222 N-78, Alpha Chemical. The times-to-failure illustrate the effects of varying the PEO/PVC ratios:

| PEO/PVC wt Ratio | Time to Failure |
| --- | --- |
| 100/0 | Too fast to measure |
| 70/30 | 6 sec |
| 50/50 | 28 sec |

While in the foregoing, embodiments of the invention have been disclosed in considerable detail for purposes of illustration, it will be understood by those skilled in the art that many of these details may be varied without departing from the spirit and scope of the invention.

I claim:

1. A toilet-disposable collection pouch having a pair of side walls each formed of a multilayered film having high interlayer adhesive strength, said multilayered film comprising a water-soluble/dispersible load-bearing layer having a thickness within the range of 1 to 5 mils and consisting essentially of a blend of polyethylene oxide and plasticized polyvinyl chloride laminated and bonded to a barrier layer having a thickness within the range of 0.05 to 1.0 mils and comprising at least one water-insoluble polymer or copolymer of vinylidene chloride, said polyethylene oxide of said blend having a viscosity average molecular weight within the range of 100,000 to 400,000 and constituting 40% to 80% of said blend, said walls being arranged with said barrier layers in facing relation and heat sealed to each other along the margins of said walls.

2. The pouch of claim 1 in which said load-bearing layer consists essentially of 40 to 80% by weight of polyethylene oxide and 60 to 20% by weight of plasticized polyvinyl chloride.

3. The pouch of claim 2 in which said load-bearing layer contains about 45 to 55% polyethylene oxide and about 55 to 45% plasticized polyvinyl chloride.

4. The pouch of claim 1 in which said load-bearing layer has a thickness of about 2 to 4 mils and said barrier layer has a thickness of about 0.1 to 0.8 mils.

5. The pouch of claim 1 in which said polyethylene oxide has a molecular weight within the range of about 200,000 to 300,000.

6. The pouch of claim 1 in which said plasticized polyvinyl chloride has a Shore A durometer value within the range of about 60 to 90 and is plasticized by an organic ester.

7. The pouch of claim 6 in which said plasticized polyvinyl chloride has a Shore A durometer value within the range of about 75 to 80 and is plasticized by a phthalic ester.

* * * * *